(12) United States Patent
Cowie et al.

(10) Patent No.: US 11,391,304 B2
(45) Date of Patent: Jul. 19, 2022

(54) ROTARY ACTUATOR

(71) Applicant: Interventek Subsea Engineering Limited, Aberdeen (GB)

(72) Inventors: Gavin David Cowie, Banchory (GB); John David Sangster, Westhill (GB)

(73) Assignee: Interventek Subsea Engineering Limited, Aberdeen (GB)

( * ) Notice: Subject to any disclaimer, the term of this patent is extended or adjusted under 35 U.S.C. 154(b) by 94 days.

(21) Appl. No.: 16/650,977

(22) PCT Filed: Nov. 2, 2018

(86) PCT No.: PCT/GB2018/053192
§ 371 (c)(1),
(2) Date: Mar. 26, 2020

(87) PCT Pub. No.: WO2019/102179
PCT Pub. Date: May 31, 2019

(65) Prior Publication Data
US 2020/0291967 A1  Sep. 17, 2020

(30) Foreign Application Priority Data
Nov. 22, 2017 (GB) ..................... 1719417

(51) Int. Cl.
*F16K 31/122* (2006.01)
*F15B 15/12* (2006.01)

(52) U.S. Cl.
CPC ............ *F15B 15/12* (2013.01); *F16K 31/122* (2013.01)

(58) Field of Classification Search
CPC ..... F15B 15/12; F16K 31/122; F16K 31/1223
USPC .......................................... 251/59
See application file for complete search history.

(56) References Cited

U.S. PATENT DOCUMENTS 4,009,644 A * 3/1977 Higuchi .................. F01C 9/002
  92/125
6,318,701 B1 * 11/2001 Gardner .................. F15B 15/12
  251/59

FOREIGN PATENT DOCUMENTS

| DE | 2309959 A1 | 8/1974 |
| FR | 2317530 A1 | 2/1977 |
| GB | 2527768 A | 1/2016 |
| GB | 2532012 A | 5/2016 |

OTHER PUBLICATIONS

International Search Report PCT/ISA/210 for International Application No. PCT/GB2018/053192 dated Jan. 17, 2019.
(Continued)

*Primary Examiner* — Umashankar Venkatesan
(74) *Attorney, Agent, or Firm* — Harness, Dickey & Pierce, P.L.C.

(57) ABSTRACT

A rotary actuator comprises a unitary housing having a cavity therein and defining a continuous internal sealing surface. A rotary piston is located within the cavity in sealing engagement with the sealing surface of the cavity such that the rotary piston divides the cavity into isolated first and second chambers, wherein the rotary piston is arranged to rotate about a rotation axis in accordance with a pressure differential applied between the first and second chambers.

19 Claims, 8 Drawing Sheets

(56) References Cited

OTHER PUBLICATIONS

Written Opinion of the International Searching Authority PCT/ISA/237 for International Application No. PCT/GB2018/053192 dated Jan. 25, 2019.
International Preliminary Report and Written Opinion for PCT/GB2018/053192 dated Jun. 4, 2020.

\* cited by examiner

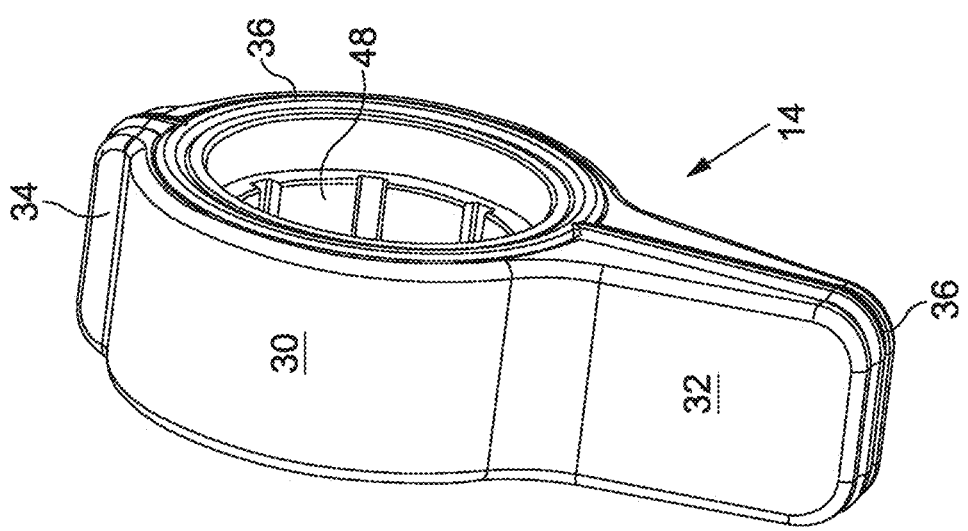
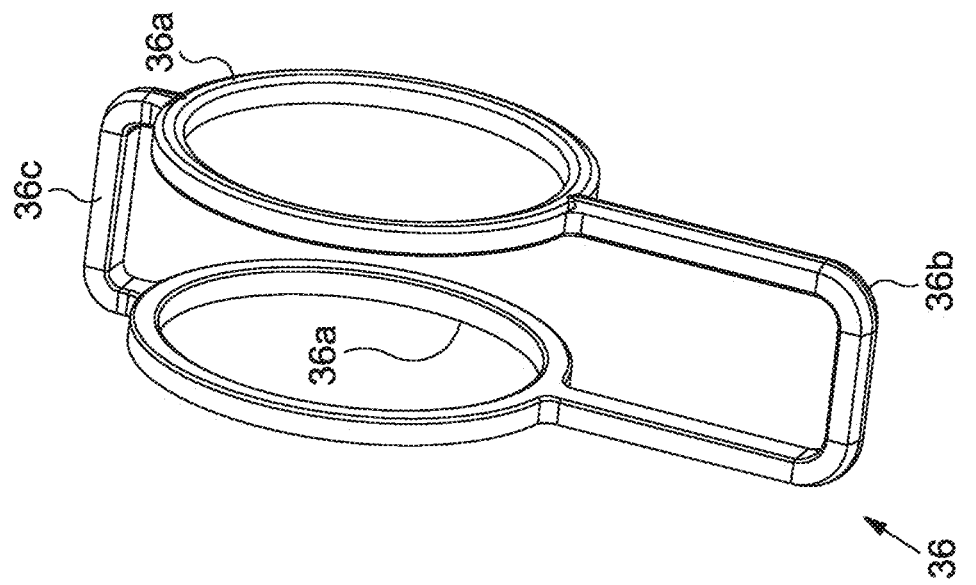
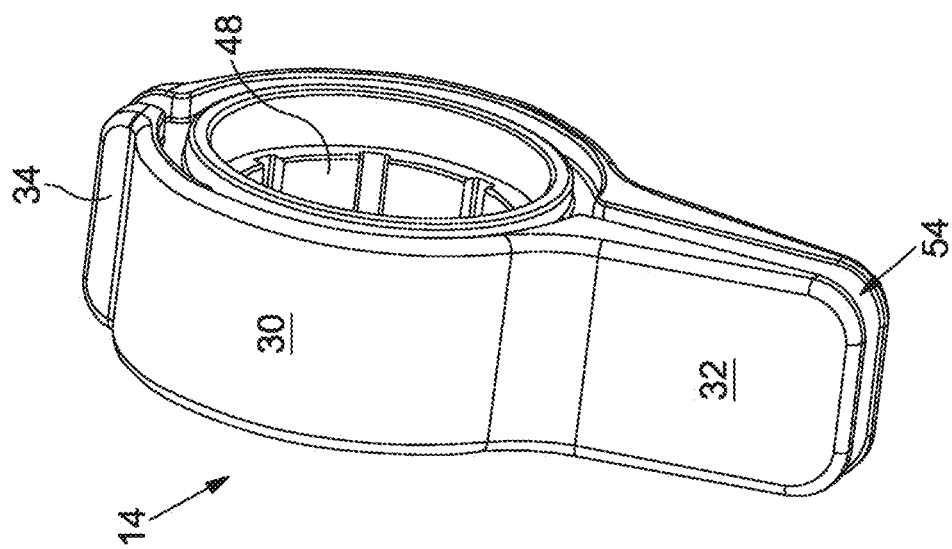

ROTARY ACTUATOR

This application is a national phase under 35 U.S.C. § 371 of PCT International Application No. PCT/GB2018/053192, which has an International filing date of Nov. 2, 2018, which claims priority to Application No. GB 1719417.6, filed Nov. 22, 2017, the entire contents of each of which are hereby incorporated by reference.

FIELD

The present disclosure relates to a rotary actuator.

BACKGROUND

Rotary actuators are used to impart a rotation on a connected component, with numerous forms of rotary actuator known in the art. One known form of rotary actuator includes a vane which is arranged to rotate within a chamber in accordance with a pressure differential applied across the vane. The performance of such an actuator to a large degree relies on the quality of sealing achieved between the vane and the chamber in order to hold the operating pressure differential. An incomplete or poor seal will allow pressurised fluid to 'bleed' across the vane which may adversely affect operation, such as by reducing the torque applied to the piston and thus output by the actuator. In some instances such pressure bleeding may cause a loss of control of an associated device. For example, in some cases a high pressure differential across the vane may be necessary to hold an associated device in a particular condition. Should the ability to hold the required pressure differential be compromised then the desired control over the device is lost.

Fluid rotary actuators are used in a wide range of applications. They are frequently used in the oil and gas industry, for example to operate valves, such as ball valves. However, rotary actuators are not limited to use in the oil and gas industry and are employed in many other technical fields where rotary actuation is required.

SUMMARY

An aspect of the present disclosure relates to a rotary actuator comprising:
  a unitary housing having a cavity therein and defining a continuous internal sealing surface;
  a rotary piston located within the cavity and in sealing engagement with the sealing surface of the cavity such that the rotary piston divides the cavity into isolated first and second chambers, wherein the rotary piston is arranged to rotate about a rotation axis in accordance with a pressure differential applied between the first and second chambers.

Thus, by providing the housing as a unitary component, the internal sealing surface of the housing extends continuously. As such, the internal sealing surface does not comprise any discontinuity, such as a joint line, for example formed between individual parts of a non-unitary housing. That is, the continuous sealing surface is not composed or defined by two or more contiguous surfaces. Any discontinuity, for example an assembled joint line, could otherwise compromise sealing quality between the rotary piston and the sealing surface. The provision of a continuous sealing surface allows a more robust dynamic seal to be provided between the sealing surface and the rotary piston. This therefore minimises the risk of bleeding of pressure between the first and second chambers. Accordingly, the ability to achieve, and hold, a pressure differential across the rotary piston (and hence the actuator output torque) is improved.

Throughout the following description, the term continuous is used. Any feature described as being continuous may also be considered to be unbroken, uninterrupted, without a break or discontinuity.

Throughout the following description, the term unitary is used. Any feature described as being unitary, may also be considered to be a single-piece and integral.

The housing, by being a unitary component, is formed from a single component, and not, for example, formed by separate integers secured together.

An aspect of the present disclosure relates to a rotary actuator, in particular to a fluid-operated rotary actuator. The rotary actuator may include a housing having a cavity therein, wherein the cavity defines the sealing surface. A rotary piston may be located within the cavity in sealing engagement with the sealing surface of the cavity such that the rotary piston divides the cavity into isolated first and second chambers, wherein the rotary piston may be arranged to rotate about a rotation axis in accordance with a pressure differential applied between the first and second chambers.

An aspect of the present disclosure relates to a fluid rotary actuator. The fluid rotary actuator may comprise a housing. The housing may have a cavity therein and the cavity may define (or be partially defined by) a sealing surface. The actuator may further comprise a rotary piston located within the cavity.

The rotary piston may be arranged to rotate about a rotation axis under the action of a working fluid in the first or second chamber. In this regard, controlled delivery and/or venting of the working fluid to/from the respective chambers may permit an operational pressure differential to be achieved.

The rotary actuator may be for use in any application where rotary actuation is required. The rotary actuator may be for outputting a fractional rotation (i.e., rotation less than 360 degrees). The rotary actuator may be a fractional turn actuator. The rotary actuator may be for use in high torque applications.

In some examples the torque output may be a function of an operational pressure differential between the first and second chambers.

In some examples a design torque may be achieved by appropriate sizing of the rotary piston.

In some examples the rotary actuator may be for use in actuating or operating a valve. More generally, the rotary actuator may be suitable for actuating flow path restriction systems.

Although not limited as such, the rotary actuator may be for use in applications associated with the oil and gas industry. In some examples the rotary actuator may be for use in valve systems, such as might be present in Xmas trees, blow-out preventers (BOPs), subsea test trees, retainer valves, lubricator valves and the like.

The rotary actuator may be configured to be coupled to a device requiring actuation. For example, the rotary actuator may be configured to be coupled to a housing of a valve. The rotary actuator may be configured to be releasably coupled to a device requiring actuation.

The rotary actuator may comprise an attachment structure for attaching to a further component, for example to a device to be actuated. The attachment structure may comprise a projection, flange, bracket or the like.

In some examples the rotary actuator may be formed as an integrated actuator of a device requiring actuation. For example, the housing of the rotary actuator may be integrally formed with a device requiring actuation. For example, the housing of the rotary actuator may be integrally formed with a valve housing.

The outer profile of the rotary actuator may be substantially defined by the housing. The housing may be substantially cylindrical. The housing may be prismatic. The cross-sectional profile of the housing may be substantially circular with a flattened section or multiple flattened sections; that is, the cross section may be substantially circular with a segment removed from one, or from more than one, location on the circumference of the circle.

The outer profile of the rotary actuator may be dictated by its intended use, location of use or the like, for example to facilitate integration with surrounding structures.

The housing may define a base unit into/onto which other features of the rotary actuator are mounted or inserted. The housing may provide structural rigidity or strength necessary to withstand operating pressures present during use of the rotary actuator.

The components of the rotary actuator may comprise high strength materials. Components of the rotary actuator may comprise any high strength material, for example metals, composites, polymeric material and the like. Non-limiting examples may include Monel, Titanium, Tool Steel, Tungsten Carbide and Super Duplex.

Components of the rotary actuator may be formed in any suitable manner, for example by one or a combination of casting, moulding, machining, additive manufacturing and the like. In some examples the selection of the forming process may be in accordance with considerations such as desired surface finish. An example manufacturing process used to form at least parts of the rotary actuator, for example on the surface of the cavity (in particular the sealing surface) to acquire a high quality of surface finish may comprise electrical discharge machining, also known as spark erosion. An opening in the housing—as described below—may provide access to the cavity in order to undertake the required machining.

An opening may be formed in the housing. The opening may be formed to allow access to the cavity. Such access may facilitate manufacturing processes, assembly processes, maintenance processes, inspection processes and the like. The opening may be formed in the housing to allow the rotary piston to be inserted into the cavity, e.g. for installation in the actuator. The opening may also allow the rotary piston to be removed from the housing, for example for inspection, repair, replacement and the like.

The opening may extend into the cavity at a location which is remote from the sealing surface. That is, the opening may be located on or through the housing such that said opening does not disrupt the sealing surface. For example, the opening may not encroach into the sealing surface, thus permitting the sealing surface to remain continuous.

The opening may be located on or through a flattened section of the outer profile of the housing. The opening may define a flattened segment on a circular outer profile of the housing.

A plurality of openings may be formed in the housing, e.g. two openings. Two openings may be arranged with one on either side of the housing.

The rotary actuator may comprise a closure structure. The closure structure may be for closing the opening. The rotary actuator may comprise a closure structure for each opening. The closure structure may comprise a panel, plate or the like which can be fixed to the housing, for example via bolting, screwing, clamping or the like. The closure structure may comprise a sealing arrangement for facilitating sealing of the opening.

The closure structure may comprise or define a surface of the cavity. Any surface defined by the closure structure may not provide any portion of the internal sealing surface.

The closure structure may define a chamber surface. The chamber surface may define a boundary of one of the first and second chambers of the actuator. In this respect a chamber may be defined between the chamber surface of the closure structure, the internal sealing surface, and the rotary piston. The chamber surface may be arranged to substantially oppose a vane surface on the rotary piston. The chamber surface may be arranged such that the rotary piston abuts the chamber surface when the rotary piston is in a fully stroked configuration.

In some examples the closure structure may not engage the rotary piston. In other examples the closure structure may engage the rotary position. For example, the closure structure may provide rotational support to the rotary piston.

The closure structure may comprise one or more fluid ports for facilitating fluid communication with the cavity, for example with an associated chamber within the cavity. Providing a fluid port on the closure structure may avoid the requirement to provide a fluid port for the same function on the housing.

The housing (and closure structure(s)) may define the cavity. The cavity may be prismatic. The cavity may have a substantially triangular cross-section. The cavity may have a substantially bow-tie shaped cross-section, defining a first lobe and a second lobe. The first lobe may be larger than the second lobe. The first lobe may define a first section of the cavity and the second lobe may define a second section of the cavity.

The rotary piston and housing may be arranged such that the rotary piston can move between a first configuration, in which the first chamber is at its minimum volume and the second chamber is at its maximum volume, and a second configuration, in which the first chamber is at its maximum volume and the second chamber is at its minimum volume. The rotary piston may be arranged to rotate between the first and the second configurations.

Fluid pressure in one or both of the first and second chambers may be controlled by a fluid control system. The rotary actuator may comprise a fluid control system. The fluid control system may comprise fluid ports as described below. The fluid control system may comprise fluid ports and connectors to admit working fluid into and out of the, a, or each, chamber.

A working fluid may for example be a gas, or a liquid such as water, brine, oil, a glycerol or silicone based hydraulic fluid, or the like.

The rotary piston may comprise a hub, defining the rotation axis, and a vane which extends from the hub, for example in a radial direction. The vane may divide the cavity into the first and second isolated chambers.

The vane may extend from a base to a tip. The vane may be of constant depth (in a direction parallel to the rotation axis). The depth of the vane may be substantially equal to a distance between two parallel faces of the sealing surface (which may be arranged perpendicular to the rotation axis). The vane may taper from a maximum width at the base (closest to the hub) to a reduced width at the tip. The width may be the dimension in the direction of rotation about the rotation axis. The same comments apply to all vanes of the rotary piston.

The vane may be located and operate within a first section of the cavity.

The rotary piston may comprise a first vane and a second vane extending from the rotation axis diametrically opposite to the first vane. Both the first and second vanes may divide the cavity into the first and second chambers. The second vane may be located within a second section of the cavity.

The second vane may be shorter in length than the first vane. The length may be measured in a radial direction from the rotation axis. That is, the first vane may extend out from the rotation axis further than the second vane. The first vane may provide a larger surface area on which a working fluid may exert pressure, than the second vane. Accordingly, when the first and second vanes are exposed to a common pressure, the resultant force acting on the first vane will dominate, and the rotary piston will rotate in a direction accordingly.

The rotary piston may comprise a sealing protrusion. A sealing protrusion may protrude from the hub of the rotary piston, similar to the vane. The sealing protrusion may comprise a groove for receiving a sealing structure. The sealing protrusion may be for location of the sealing structure such that it can contact the sealing surface to provide the seal. The sealing protrusion may be defined by a second vane or vane-like structure.

The rotary actuator may comprise a sealing structure between the rotary piston and the internal sealing surface. Accordingly, sealing engagement between the rotary piston and the internal sealing surface may be achieved via the sealing structure.

The sealing structure may be integrally formed with the rotary piston.

The sealing structure may be provided separately from the rotary piston.

The sealing structure may be formed of a single unitary component. The sealing structure may be composed of any suitable material, such as an elastomer, polymer, metal and/or the like.

In some examples the sealing structure may be formed from multiple components.

The sealing structure may be compliant. The sealing structure may be sufficiently compliant to allow it to be installed in or on the rotary piston. Providing compliance within the seal may also/alternatively accommodate assembly of the rotary actuator, for example to permit the rotary piston and sealing structure to be readily installed, and subsequently facilitate desired sealing.

The rotary piston may comprise a groove around its periphery for receiving the sealing structure. In some examples the sealing structure may be separately formed and subsequently mounted within the groove. In other examples the sealing structure may be directly moulded into the groove. The rotary piston may comprise a continuous groove. The groove may be located around the edge of the rotary piston and may be for locating the sealing structure. The groove may have a depth such that the sealing structure, when located in the groove, protrudes from the surface of the rotary piston in order to seal against the sealing surface of the cavity.

The sealing structure may extend around the edge of a vane of the rotary piston. The sealing structure may extend around the circumference of a hub of the rotary piston. The sealing structure may extend around the periphery of a sealing protrusion provided on the rotary piston.

The sealing structure may comprise two circular sections arranged to extend around the circumference of either side of the hub. The sealing structure may comprise a lobe or loop, connecting the two circular sections and arranged to extend around the edge of the vane. The sealing structure may comprise a second lobe or loop, connecting the two circular sections and arranged to extend around the edge of the sealing protrusion, or a second vane when present.

The sealing surface of the cavity may comprise or be defined by every face or surface area of the cavity arranged to cooperate with the rotary piston to isolate the first chamber from the second chamber during use.

The sealing surface may comprise an arcuate face defining an outer surface of the first and second chambers, along which a tip of the rotary piston moves when the rotary piston rotates. The sealing surface may comprise two opposing faces which define opposing sides of the chambers. The opposing faces may be parallel to each other. The opposing faces may extend laterally relative to the rotational axis of the rotary piston. The opposing faced may be perpendicular to the rotational axis. The two opposing faces may extend continuously with the arcuate face.

The sealing surface may comprise two arcuate faces defining the outer surface of the first and second chambers, along which a tip of the vane and a sealing protrusion move.

The sealing surface may comprise a first arcuate face defining an outer surface of the first and second chambers, along which a tip of the first vane moves when the rotary piston rotates. The sealing surface may comprise a second arcuate face along which a tip of the sealing protrusion moves when the rotary piston rotates. The sealing surface may comprise two opposing faces connecting the first and second arcuate faces.

The second arcuate face may be part of the first arcuate face.

The actuator may comprise a, or a plurality of, fluid ports for providing fluidic communication with the first chamber (and second chamber). The actuator may comprise a first fluid port for providing fluidic communication with the first chamber and a second fluid port for providing fluidic communication with the second chamber. The fluid port(s) may be part of the fluid control system.

The fluid port may be for managing and controlling the pressure in a respective chamber (e.g. the first or second chamber). The fluid port may be for inputting fluid into a chamber, for example the first or second chamber. The fluid port may be for allowing fluid to leave a chamber. The actuator may comprise a plurality of fluid ports for inputting/outputting fluid into/from the chamber(s), in order to actuate the rotary piston.

The fluid port may be located in the closure structure. The fluid port may be arranged to be located in the same surface of the actuator as the opening. The fluid port may be arranged such that fluid can enter/leave the chamber through a surface of the closure structure.

Fluid may be pumped or injected into the first chamber, through the first fluid port; and fluid may simultaneously vacate the second chamber, through the second fluid port, when the rotary piston rotates in a first direction. Fluid may be pumped or injected into the second chamber, through the second fluid port; and fluid may simultaneously vacate the first chamber, through the first fluid port, when the rotary piston rotates in a second direction. Further chambers may necessitate further fluid ports.

The actuator may further comprise a drive structure. The drive structure may be arranged to extend along the rotation axis and rotate about the rotation axis. The drive structure may comprise a drive shaft.

The drive structure may be arranged to extend into the cavity of the housing through a hole in the housing. Appropriate sealing may be provided between the drive structure and the housing. The drive structure may be arranged to extend all the way through the cavity of the housing, along the rotation axis. The drive structure may be arranged to extend all of the way through the housing. The drive structure may be arranged to protrude from opposite sides of the housing. The drive structure may be supported on both sides of the rotary piston, for example by the housing.

The drive structure may extend from only one side of the rotary piston. The drive structure may be supported on only one side of the rotary piston. The drive structure may be a cantilevered drive structure.

The drive structure may be coupled to the rotary piston and may be arranged to rotate about the rotation axis. The drive structure may be insertable into a hole in the rotary piston.

The drive structure may be rotatably coupled to the rotary piston, for example via a keyed connection, splined connection, non-round profile connection or the like.

The inner profile of the hole and the outer profile of the drive structure may both comprise axial slots arranged circumferentially. The sets of slots may be arranged to be aligned when the drive structure is located in the rotary piston. Each pair of aligned slots may be arranged to receive locking bars, which rotationally fix the drive structure relative to the rotary piston. The inner profile of the hole and outer profile of the drive structure may be castellated and arranged such that the castellations align to define vacancies, into which the locking bars can be inserted.

The rotary actuator may comprise a ratchet. The ratchet may be configured to transmit torque from the rotary piston in a first direction, but not transmit torque from the rotary piston in a second direction.

The ratchet may be located, for example, between the rotary piston and a drive structure. The ratchet may be configured to allow relative rotation between the rotary piston and the drive structure in a first direction, but not in a second direction. The ratchet may be connected to the rotary piston and the drive structure. The ratchet may be configured to transmit rotational torque from the rotary piston to the drive structure when the rotary piston rotates in a first direction (i.e. not allow relative movement between the rotary piston and the drive structure in a first direction), but not transmit rotation torque from the rotary piston to the drive structure when the rotary piston rotates in a second direction (i.e. allow relative movement between the rotary piston and the drive structure in a second direction). A ratchet may allow the actuator—which may be a fractional turn actuator—to repeatedly rotate a connected component in a first direction without rotating the connected component in a second direction. This would allow the actuator to rotate connected components in only one direction. In some examples, the control direction of the ratchet may be switched or switchable, to facilitate reverse operation.

The drive structure may extend through an attachment structure which facilitates attachment to a component or device requiring actuation. The attachment structure may surround the drive structure. The attachment structure may support the drive structure. The attachment structure may act as an interconnector, to allow the actuator to be connected to a further component, for example a ball valve.

The rotary actuator may comprise a support plate attached to the housing to support the drive structure. The support plate may be arranged on the other side of the rotary piston to the attachment structure. Both the attachment bracket and support plate may be attached to the housing by screws, extending through the respective component into blind holes in the housing.

An aspect of the present disclosure relates to a valve apparatus, comprising:
a valve housing defining a flow path;
a valve member mounted in the housing; and
a rotary actuator as described anywhere herein, coupled to the valve member and operable to rotate the valve member to control fluid flow along the flow path as the rotary piston rotates.

The valve apparatus may further comprise a second rotary actuator coupled to the valve member and operable to rotate the valve member to control fluid flow along the flow path as the rotary piston rotates. The second rotary actuator may be arranged coaxially (with respect to the rotation axis) to the first actuator. The second rotary actuator may be located on the opposite side of the valve member. The second rotary actuator may be configured to rotate the drive structure in the same direction as the first actuator.

The valve housing and the rotary actuator housing may be separately formed. Alternatively, the valve housing and the rotary actuator housing may be integrated.

An aspect of the present disclosure relates to a valve block comprising: a housing defining a flow path; a first valve member mounted in the housing; a first rotary actuator as described anywhere herein, coupled to the first valve member and operable to rotate the first valve member to control fluid flow along the flow path as the rotary piston rotates; a second valve member mounted in the housing; and a second rotary actuator as described anywhere herein, coupled to the second valve member and operable to rotate the second valve member to control fluid flow along the flow path as the rotary piston rotates.

A valve block may comprise a plurality of different valve types. Each valve may be actuated by one, or a plurality of, rotary actuators. The rotary actuators may be sized so as to provide suitable actuation torques for the specific valve type.

Rotary Actuators as described herein may be integral with valve apparatus or valve blocks—i.e. the housing of the actuator may form part of the housing of the valve apparatus or the valve block. Alternatively, the actuators may be separable from the valve apparatus or valve block and may be connected to the valve apparatus or valve block—for example by means of an attachment bracket.

The valve apparatus may be used in a oil and gas applications, for example topside application, subsea application or the like. For example, a subsea test tree may comprise a valve apparatus or valve block as described above. A blow-out preventer may comprise such a valve apparatus or valve block.

The rotary actuator may also be used in any application requiring rotational actuation, particularly a partial turn actuation mechanism. The may be used in construction applications, maintenance applications, fluid control applications, manufacturing applications, automotive applications and the like.

The rotary actuator may be installed as part of a larger apparatus and thus may be permanently connected to a surrounding apparatus. Alternatively, the rotary actuator may be embodied as a portable actuator. The rotary actuator (or the rotary piston or drive structure) may be configured to releasably engage an external drive structure. Alternatively, the actuator may comprise a drive structure (for example a drive shaft) which is configured to releasably engage a connector of an external apparatus. The rotary actuator may be embodied as a portable apparatus, for example a handheld apparatus which can be connected to an external connector, actuated to rotate the external connector, disconnected from the external connector and then transported to a new location.

An actuator apparatus—for example the valve apparatus or a valve block—may comprise two or more actuators as described herein. The second actuator may be connected to the same connected component (e.g. the valve member) as the first actuator, for example diametrically opposite the first actuator. The second actuator may be operated simultaneously with the first actuator to increase the torque of the valve apparatus. Alternatively, the two actuators may be sequentially operated to alternate the output rotation direction. Alternatively, if each actuator has a ratchet as described above, the two actuators may be sequentially activated to continually rotate a connected component—the first actuator may output a first rotation in a first direction and then, as the first actuator rotates in a second direction back to the starting orientation, the second actuator may be outputting a rotation in the first direction.

An aspect of the present disclosure relates to a method for providing rotary actuation using a rotary actuator as described anywhere herein.

Features defined in relation to one aspect may be equally utilised in relation to any other aspect.

BRIEF DESCRIPTION OF THE DRAWINGS

Examples of the present disclosure will now be described with reference to the following figures, in which:

FIG. 5A is a perspective view of a rotary piston of the actuator of FIG. 1;

FIG. 5B is a perspective view of a sealing structure to be installed on the rotary piston of FIG. 5A;

FIG. 5C is a perspective view of the sealing structure of FIG. 5B instated on the rotary piston of FIG. 5A;

DETAILED DESCRIPTION OF THE DRAWINGS

Figure 1:
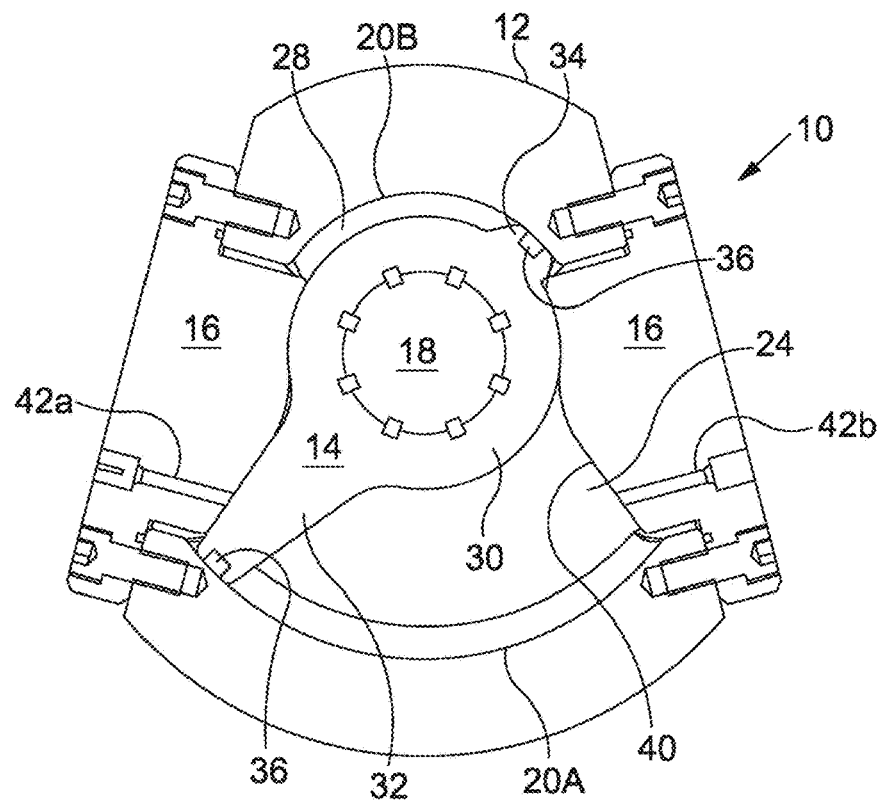
FIG. 1 is a cross-section of a rotary actuator according to the disclosure in a first configuration.
Figure 2:
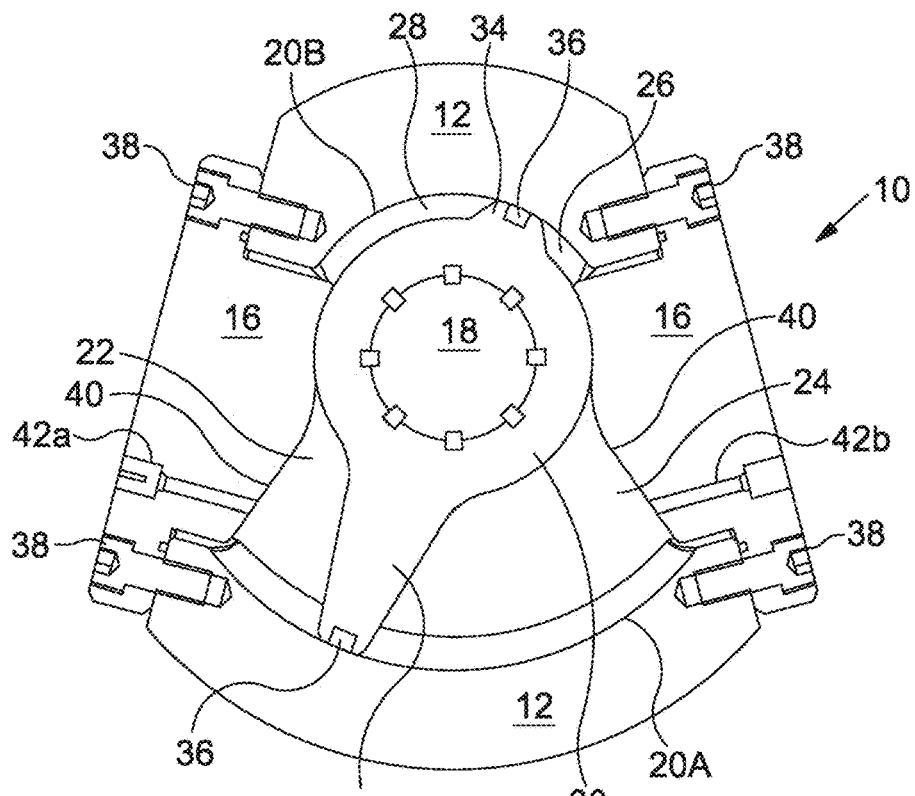
FIG. 2 illustrates the actuator of FIG. 1 during an initial rotation phase.
Figure 3:
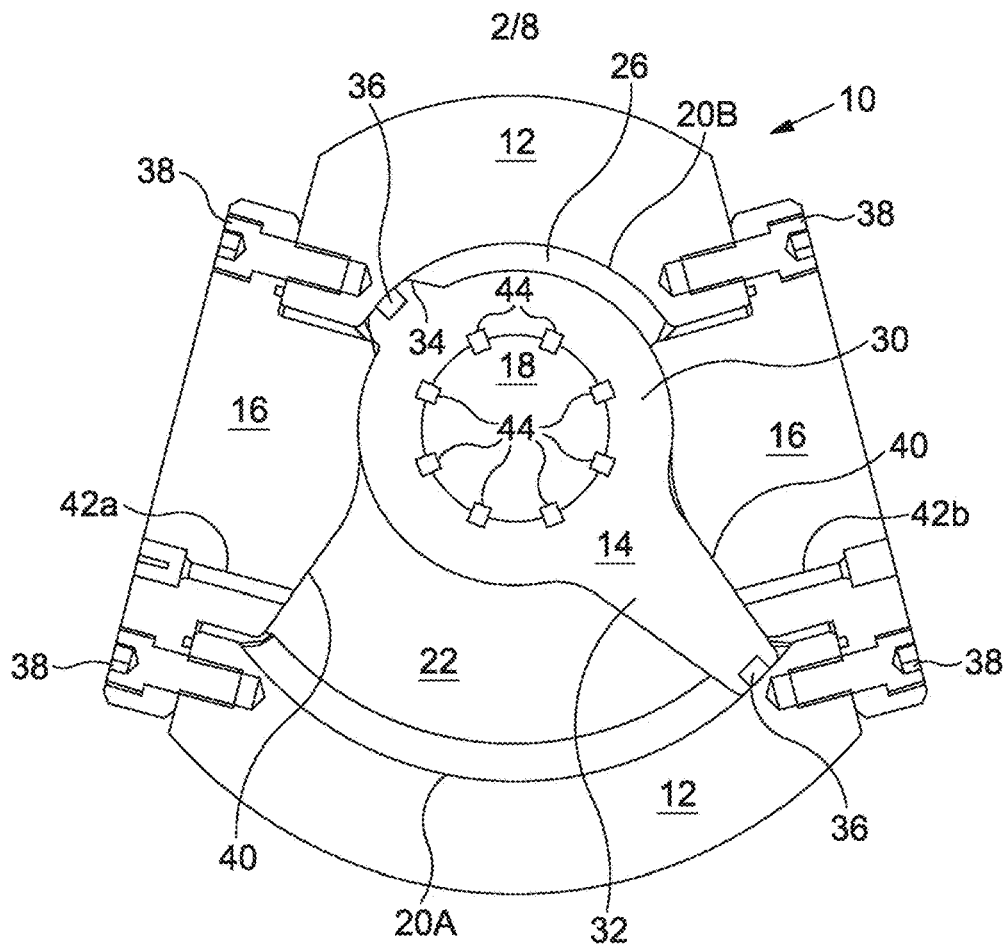
FIG. 3 illustrates the actuator of FIG. 1 in a second configuration.

FIGS. 1 to 3 depict a cross-section of a rotary actuator 10. The actuator 10 comprises a housing 12, a rotary piston 14, two closure structures 16 and a drive structure or shaft 18.

The actuator 10 is configured such that the rotary piston 14 is arranged to rotate about a rotation axis which, in FIG. 1, is perpendicular to the plane of the cross-section, through the centre of the drive structure 18.

The housing 12 comprises a substantially hollow cylinder with flattened portions on either side. The housing 12 is sealed on either end, thus defining a cavity inside the housing 12. The housing 12 is arranged so as to support the other components of the actuator 10 and withstand the forces exerted on the actuator by a working fluid during use. In order to provide a housing with the required surface tolerances (in particular for the sealing surface, described below) the housing 12 or a part thereof may be machined using electrical discharge machining. Electrical discharge machining may provide the benefit of producing a high quality surface finish, while still being suitable for use inside the cavity of the housing 12. Access to the cavity of the housing may be provided by an opening.

The housing 12 is a unitary housing. That is, the housing 12 is formed as a single part and does not comprise a plurality of parts which have been joined together. As such, the housing 12 does not have any seams, joints, weld lines or other surface imperfections caused by connecting separate parts to form the housing.

The housing 12 has a cavity in which the rotary piston 14 is located. The cavity can be accessed through two openings—one on either side of the housing 12 as viewed in FIG. 1. The openings are located on the flattened portions of the curved outer surface of the housing 12. The openings comprise substantially rectangular access ways through which the cavity can be accessed. The openings allow the rotary piston 14 to be installed in the cavity. In FIGS. 1 to 3, the openings are closed and sealed by the closure structures 16.

The rotary piston 14 comprises a hub 30 and a vane 32. The rotary piston 14 also comprises a sealing protrusion 34, which is located on the hub 30, diametrically opposite the vane 32. When installed in the cavity, the hub 30 is located around the rotation axis, and is attached to the drive structure 18 (discussed below). The vane 32 extends radially outwardly from the hub 30 (and hence the rotation axis). The width of the vane 32 is tapered and hence the dimension of the vane in the circumferential direction at the base of the vane 32, where it connects to the hub 30, is larger than that at the tip of the vane 32. The sealing protrusion 34 extends radially out from the hub diametrically opposite to the vane 32. The sealing protrusion 34 also has a tapered width; the length of the sealing protrusion 34 is significantly shorter than that of the vane 32.

A sealing structure 36 extends around the rotary piston 14. In particular, the sealing structure 36 extends around the exposed sides of the vane 32 and sealing protrusion 34. The sealing structure 36 is located in a groove in the rotary piston 14 (discussed in more detail below) and projects from the outer surface of the body of the rotary piston to sealingly engage internal surfaces of the cavity. In this respect, the surfaces of the cavity which are sealingly engaged in this manner may be defined as an internal sealing surface. The sealing structure 36 contacts the sealing surface around the periphery of the vane 32 such that the vane 32 (in addition to the hub 30 and sealing protrusion 34) divides the cavity into isolated first and second chambers 22, 24. The rotary piston 14 also defines smaller chamber-like spaces 26, 28 either side of the sealing protrusion 34. The hub 30 of the rotary piston 14 does not seal against the inside surface of the closure structure 16. As such, the space 26 to the right of the sealing protrusion 34 (as viewed in FIGS. 1 to 3) is fluidically connected to the second chamber 24. The space 28 to the left of the sealing protrusion 34 is fluidically connected to the first chamber 22. Accordingly, the spaces form parts of the first and second chambers 22 24.

As noted above, the faces of the cavity (i.e. the internal faces of the housing 12) that are engaged by the sealing structure 36 during operation of the actuator 10 form an internal sealing surface. In this respect the sealing surface 20 comprises an arcuate face 20A defining an outer surface of the first and second chambers 22 24 and two parallel opposing faces which are perpendicular to the rotation axis and define the sides of the first and second chambers. One of the parallel opposing faces is partially visible in FIGS. 1 to 3, located behind the rotary piston 14.

The sealing surface of the actuator 10 is continuous, by virtue of the sealing surfaces being provided only on the housing 12, and the housing 12 being unitary. That is, there are no surface discontinuities caused by the joining of one or more parts to provide the sealing surface. Surface discontinuities caused by weld lines or joints between components may otherwise provide a location where a robust seal cannot be provided, or is at least difficult to achieve. Having a continuous sealing surface permits a high quality seal to be established between the sealing structure 36 and the sealing surface, maximising the possible pressure differential across the rotary piston 14 and output torque.

As described above, the housing 12 has two openings—one on either side of FIGS. 1 to 3. Each of the openings is sealed by a closure structure 16. The closure structures 16 comprise outer plate structures which are secured to the housing 12 via attachment screws 38 which extend through the closure structure 16 into threaded holes in the housing 12, located around the periphery of the of each opening. A seal member is interposed between each closure structure 16 and the housing 12.

When the closure structures 16 are in place, they partially define a boundary of an associated chamber 22, 24. For example, a chamber surface 40 of the closure structure 16 illustrated on the right of FIGS. 1 to 3 defines a surface of the second chamber 24. The chamber surface 40 is arranged to abut the rotary piston 14 when the rotary piston is in a hard stroked position (i.e. one of the first and second configurations discussed below). The chamber surface 40 is arranged to arrest the rotary movement of the rotary piston 14 when in the first or second arrangement (that is, a hard stroked arrangement).

The chamber surface 40 may define a profile which is complimentary to the outer surface of the hub 30 of the rotary piston 14. In some examples a slight interference may be present between the hub 30 and closure structures 16. In such an example the closure structures 16 may provide a degree of support or stability to the rotary piston 14. In other examples, however, a clearance gap may be provided between the hub 30 and the closure structures 16.

In the present example no sealing is provided between the closure structures 16 and the hub 30. As such, fluid can travel from the first and second chambers 22 24, between the left and right closure structures 16 and the hub 30, into the spaces 26 28 shown above the hub.

When the first chamber 22 is a high pressure chamber and the second chamber 24 is a low-pressure chamber, the pressure differential across the vane 32 urges the rotary piston to rotate in an anti-clockwise direction (as depicted in FIGS. 1 to 3). The pressure differential across the sealing protrusion 34 urges the rotary piston to rotate in a clockwise direction. As the vane 32 is longer than the sealing protrusion 34, and hence the surface area of the vane 32 is larger than the sealing protrusion 34, the torque resulting from the pressure differential across the vane 32 exceeds that of the sealing protrusion 34 and the resultant torque (and hence rotation) is in the anti-clockwise direction as viewed in FIGS. 1 to 3.

Each closure structure 16 comprises a fluid port 42a, 42b. Each fluid port 42a, 42b is for controlling the inflow/outflow of working fluid in a respective chamber 22, 24 and thus the corresponding pressure of the chamber 22, 24. The first fluid port 42a, on the left of FIGS. 1 to 3, controls the flow of working fluid into and out of the first chamber 22 (and hence also the space 28). The second fluid port 42b, on the right of FIGS. 1 to 3, controls the flow of working fluid into and out of the second chamber 22 (and hence also the space 26). The fluid ports 42a, 42b are connected to other parts of a fluid control system such as connectors, pumps and control modules. The fluid control system is configured to selectively pressurise and depressurise the first and second chambers 22, 24.

The openings are located in surfaces which are separate, i.e. remote, from the sealing surface within the cavity. The openings therefore are arranged to not encroach on the sealing surface 20. Accordingly, the surface of the housing/cavity on which an opening is formed does not form part of the sealing surface 20.

The drive structure 18 is connected to the rotary piston 14 and transfers the rotational movement and torque from the piston 14 to a further connected component to be rotated (e.g. a ball-valve). In the present example, the drive structure comprises a drive shaft. The drive shaft 18 extends along the rotation axis, into the centre of the hub 30 of the rotary piston 14, where the drive shaft 18 it is rotationally fixed with respect to the rotary piston 14. The drive shaft 18 extends through circular holes in either side of the housing 12. Accordingly, the drive shaft 18 is supported by the housing 12 on both sides of the rotary piston 14. This may improves loading distribution within the housing 12 and drive shaft 18.

Figure 4:
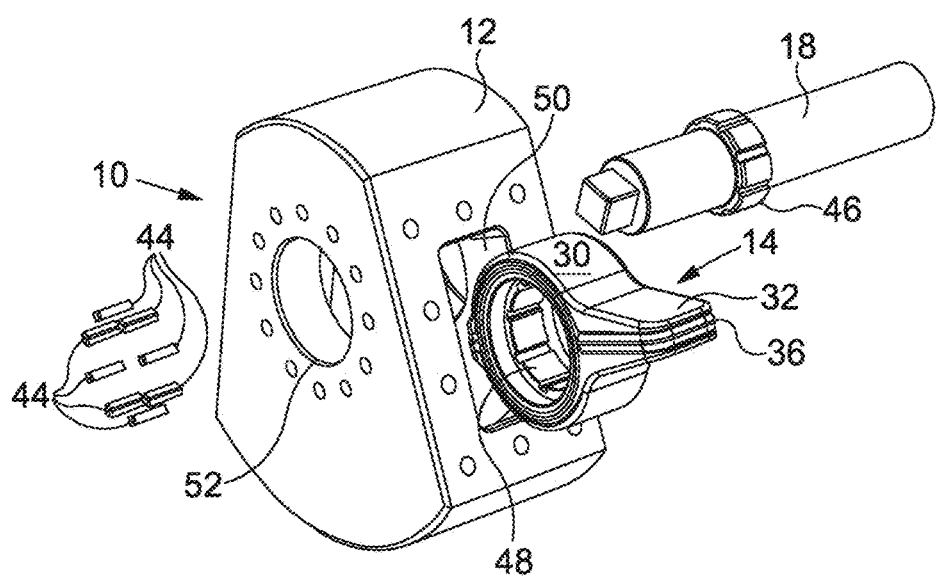
FIG. 4 is a perspective, exploded view of the actuator of FIG. 1.

The drive shaft 18 comprises a circumferentially-castellated external region 46 which aligns with a castellated region 48 on the inner surface of the rotary piston 14 (see FIG. 4). The castellated regions are aligned such that substantially cuboidal vacancies are defined between the abutting castellations of the drive shaft 18 and the rotary piston 14. Locking bars or keys 44 are inserted into the vacancies and rotatably lock the drive shaft 18 relative to the rotary piston 14.

In use, the rotary piston 14 is operable to rotate between a first and a second configuration. The first and second configurations correspond to fully stroked positions of the rotary piston 14.

FIG. 1 shows the actuator 10 with the rotary piston 14 in the first configuration. In this arrangement the first chamber 22 is at its minimum volume and the second chamber 24 is at its maximum volume. The second chamber 24 may be at a high pressure. The first chamber 22 is at a low pressure. In FIG. 2, the rotary piston 14 is shown partially rotated between the first and second configurations, in response to a pressure differential across the vane 32. In FIG. 2, fluid has entered the first chamber 22 via fluid port 42a such that the first chamber 22 is at a higher pressure than the second chamber 24. The second chamber 24 is at a lower pressure; the fluid port 42b is allowing fluid to vent from the second chamber 24.

As discussed above, the torque resulting from the pressure differential across the vane 32 exceeds that resulting from the pressure differential across the sealing protrusion 34 and so the rotary piston 14 rotates in an anti-clockwise direction.

Turning now to FIG. 3, once the rotary piston 14 has rotated about 110 degrees (in this example) from that shown in FIG. 1, the rotary piston 14 abuts the chamber surface 40 of the right hand closure structure 16, which arrests its movement. The rotary piston 14 has now rotated as far in an anti-clockwise direct as it can and is in the second configuration. The pressure of the working fluid in the first chamber 22 maintains the rotary piston 14 in the second arrangement. Naturally, the drive shaft 18 is rotationally fixed with respect to the rotary piston 14 and so rotates with the rotary piston 14. This rotation can be used to operate any component, apparatus etc. coupled to the drive shaft 18.

FIG. 4 is an exploded perspective view of some components of the actuator 10. The housing 12 can be seen to be substantially cylindrical with two substantially symmetrical flat portions which locally modify the outer cylindrical surface.

An opening 50 can be seen on the flat surface. The opening 50 is arranged (e.g. sized and shaped) so as to allow the rotary piston 14 to be inserted into the cavity. Accordingly, the height and width of the opening 50 are larger than that of the hub 30 of the rotary piston 14.

Threaded holes surround the opening 50 and are for receiving the attachment screws 38 of the closure structure 16, to allow the closure structure 16 to close and seal the opening 50.

Drive shaft 18 can be seen aligned along the rotation axis. When the rotary piston 14 is in location within the cavity of the housing 12, the drive shaft 18 can be inserted through circular side holes 52 in the housing 12 such that the drive shaft 18 extends out from both sides of the housing 12, and the locking bars 44 can be inserted to rotationally-lock the drive shaft 18 with respect to the rotary piston 14.

FIGS. 5A to 5C show the rotary piston 14. With reference to FIG. 5A, the rotary piston 14 comprises a groove 54 in which the sealing structure 36 is located. The groove 54 extends around all of the sides of the rotary piston 14 which come into contact with the sealing surface 20. The sealing protrusion 34 is provided to define the groove 54 for supporting the sealing structure 36 in a position to abut the sealing surface 20. The groove 54 is of a width to prevent the sealing structure 36 from shifting during use, and of a depth to allow the sealing structure 36 to protrude slightly from the outer edges of the rotary piston body in order to engage the sealing surface 20 and provide the seal. The groove 54 extends around the periphery of both the vane 32 and the sealing protrusion 34, as well as the circumference of both sides of the hub 30.

FIG. 5B depicts the sealing structure 36, separate from the rest of the rotary piston 14. The sealing structure 36 can be made from any material known as being suitable for use as a sealing structure, for example a polymer, elastomer or the like. The sealing structure 36 is shaped so as to extend around all of the faces of the rotary piston 14 which contact the sealing surface 20. The sealing structure 36 has two circular sections 36a, arranged to extend around the circumference of either side of the hub 30, connected by two lobes 36b,c, or loops, arranged to extend around the edge of the vane 32 and sealing protrusion 34, respectively.

FIG. 5C illustrates the sealing structure 36 located within the groove 54 of the rotary piston 14. As has been described, the groove 54 is shaped such that the sealing structure 36 protrudes from the surface of the rotary piston body sufficiently to provide a robust seal with the sealing surface 20.

Figure 6:
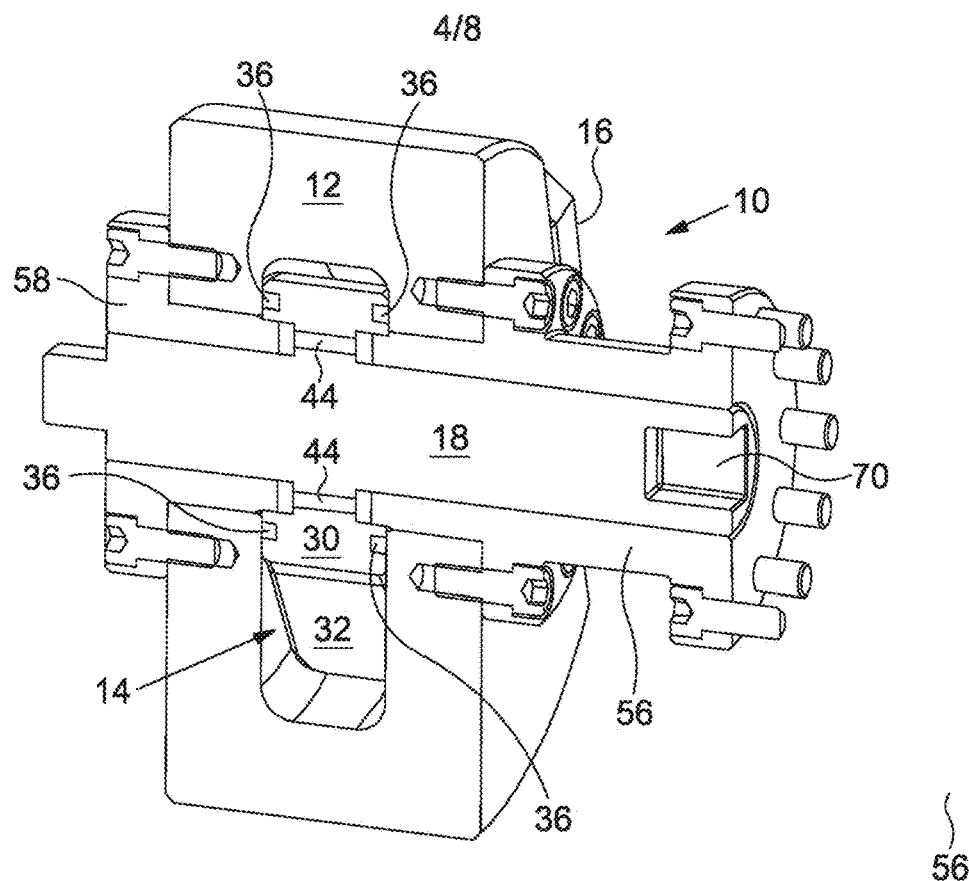
FIG. 6 is a perspective cross-section view of a rotary actuator according to the disclosure.

FIG. 6 shows a cross-section through the actuator perpendicular to those of FIGS. 1 to 3. In FIG. 6, the actuator 10 comprises an attachment structure 56 which is attached to and extends from the housing 12 such that it surrounds the drive shaft 18. The attachment structure 56 both supports the drive shaft 18, and also acts as an interconnector, to allow the actuator 10 to be connected to a further component, for example a valve. On the other side (the left side in FIG. 6) of the housing, a support and sealing plate 58 is attached to the housing to support the drive shaft 18 on the other side of the rotary piston 14. Both the attachment structure 56 and support plate 58 are attached to the housing 12 by screws, extending through the respective component into threaded holes in the housing 12.

A square recess or socket 70 is present on the end of the drive shaft 18, the square recess is to allow the drive shaft 18 to be connected to neighbouring components in order to transfer the rotation and torque of the drive shaft 18. Of course, any other form of interface may be provided.

Figure 7:
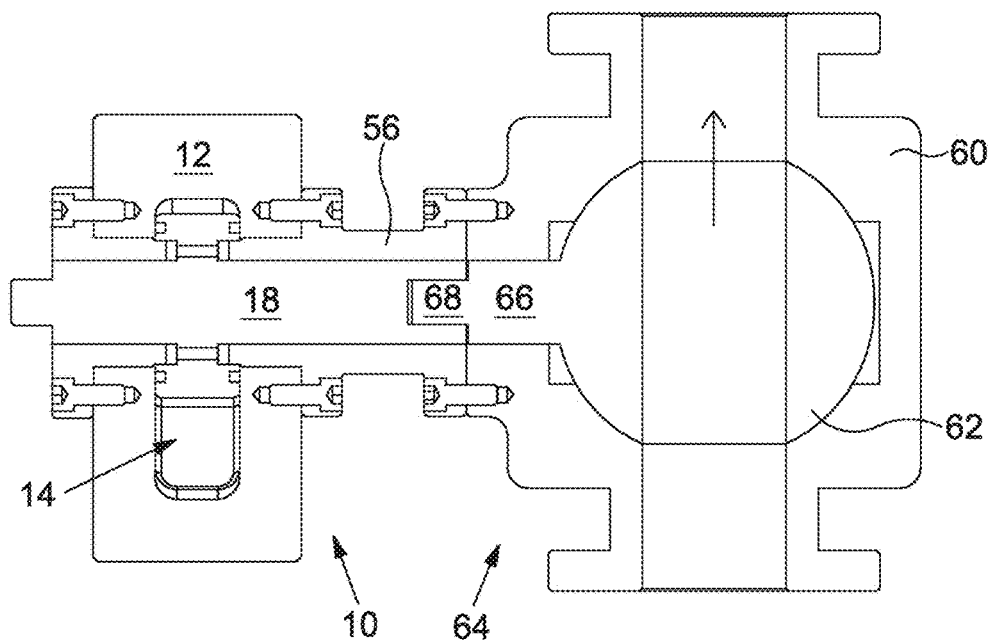
FIG. 7 is a cross-section view of the rotary actuator of FIG. 6 coupled to a valve apparatus.

FIG. 7 depicts an actuator 10 attached to a ball valve apparatus 64 comprising a housing 60 and valve-member 62, specifically a ball valve member in this example, which is arranged to rotate to selectively open and close a flow path through the valve apparatus 64. In this respect the actuator 10 provides the required rotary actuation or operation to the valve member 64. The actuator 10 is attached to the ball valve apparatus 64 by the attachment structure 56, which is fixed to the ball valve housing 60 by screws. The drive shaft 18 is collinear with, and connected to, a drive structure 66 of the ball valve apparatus 64. A square protrusion 68 on the end of the drive apparatus 66 locates inside the square recess 70 on the end of the drive shaft 18, thus allowing the rotational motion and torque of the drive shaft 18 to be transferred to the drive apparatus 66 and ball valve-member 62.

Figure 8:
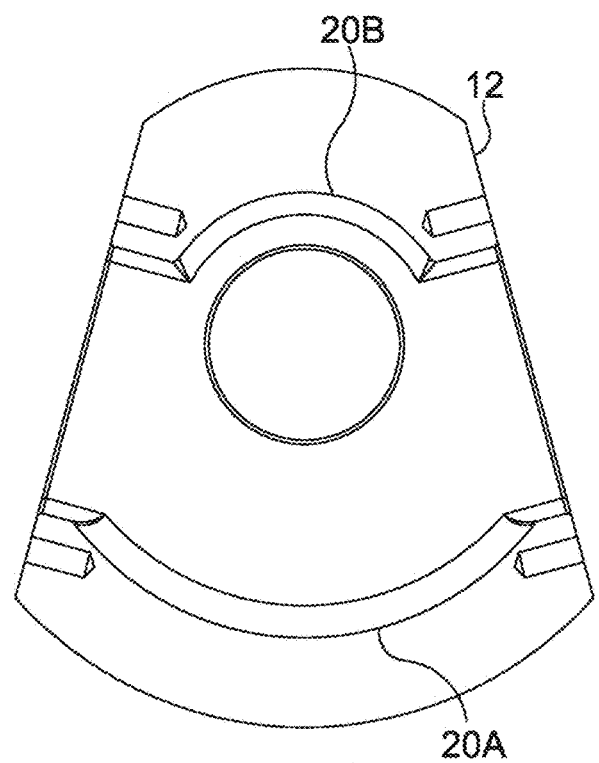
FIG. 8 is a cross-section view of the housing of a rotary actuator according to the disclosure.
Figure 9:
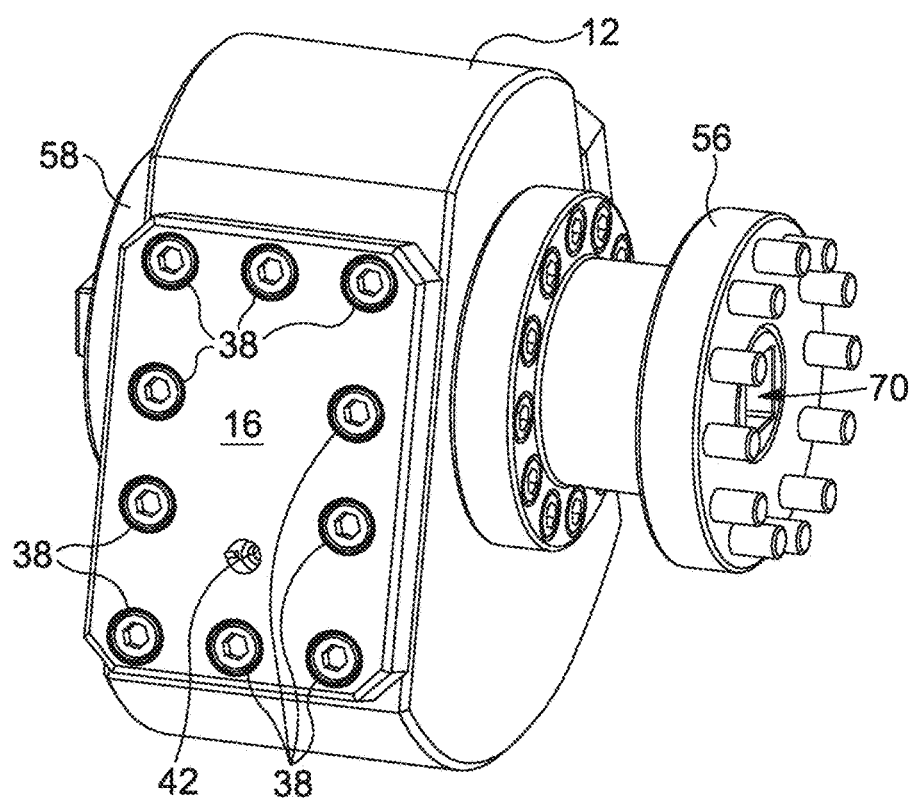
FIG. 9 is a perspective view of an actuator according to the disclosure.
Figure 10:
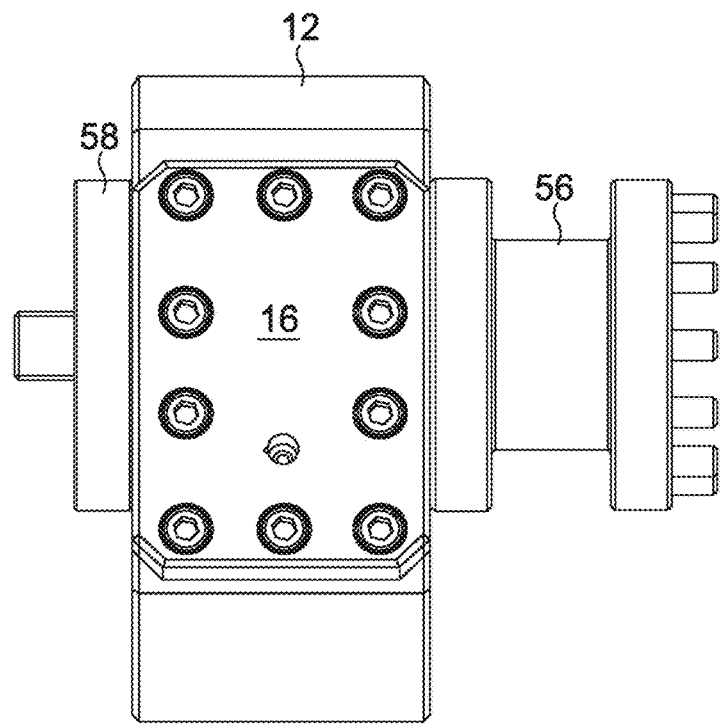
FIG. 10 is a side view of the actuator of FIG. 9.
Figure 11:
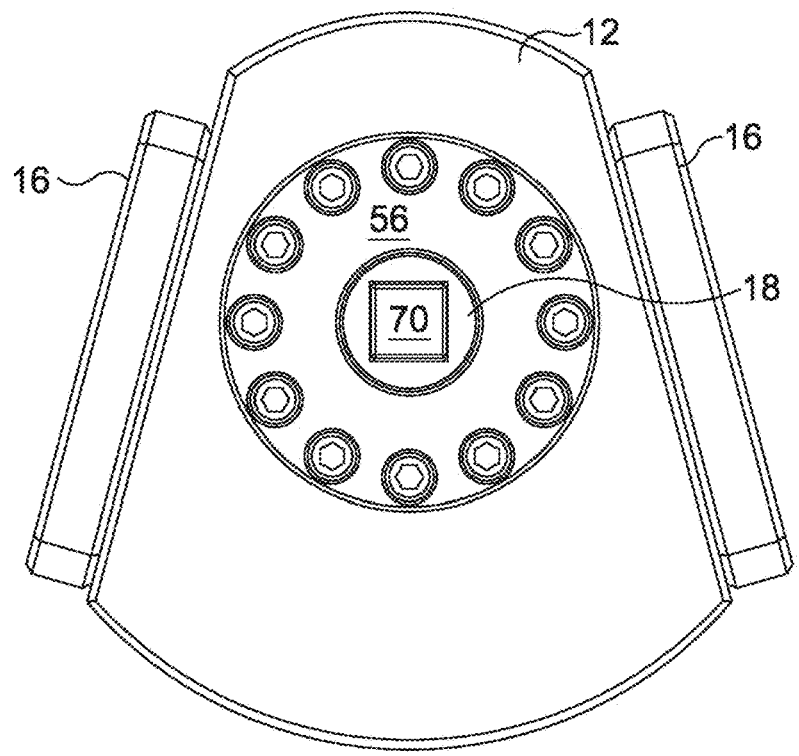
FIG. 11 is a front view of the actuator of FIG. 9.
Figure 12:
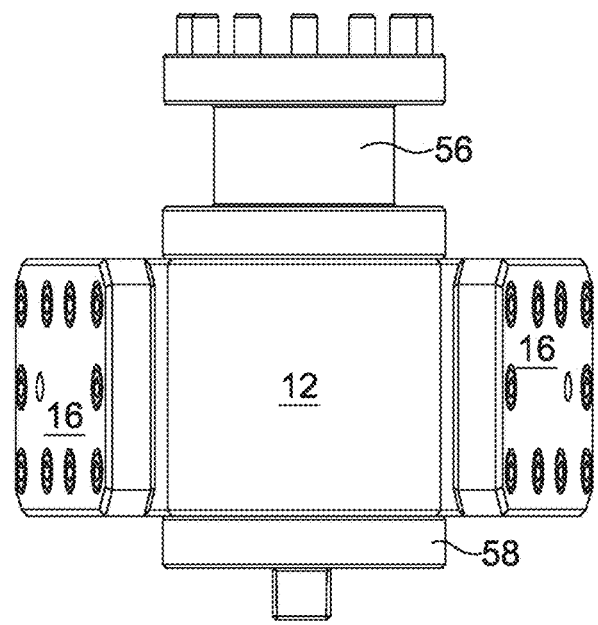
FIG. 12 is a top view of the actuator of FIG. 9.

FIG. 8 is a cross-section through the housing 12 of the actuator 10. The hole through which the drive shaft 18 is inserted can be seen, aligned with the rotation axis of the actuator 10.

FIGS. 9, 10, 11 and 12 show a perspective, side, front and top view of the actuator 10, respectively.

Figure 13:
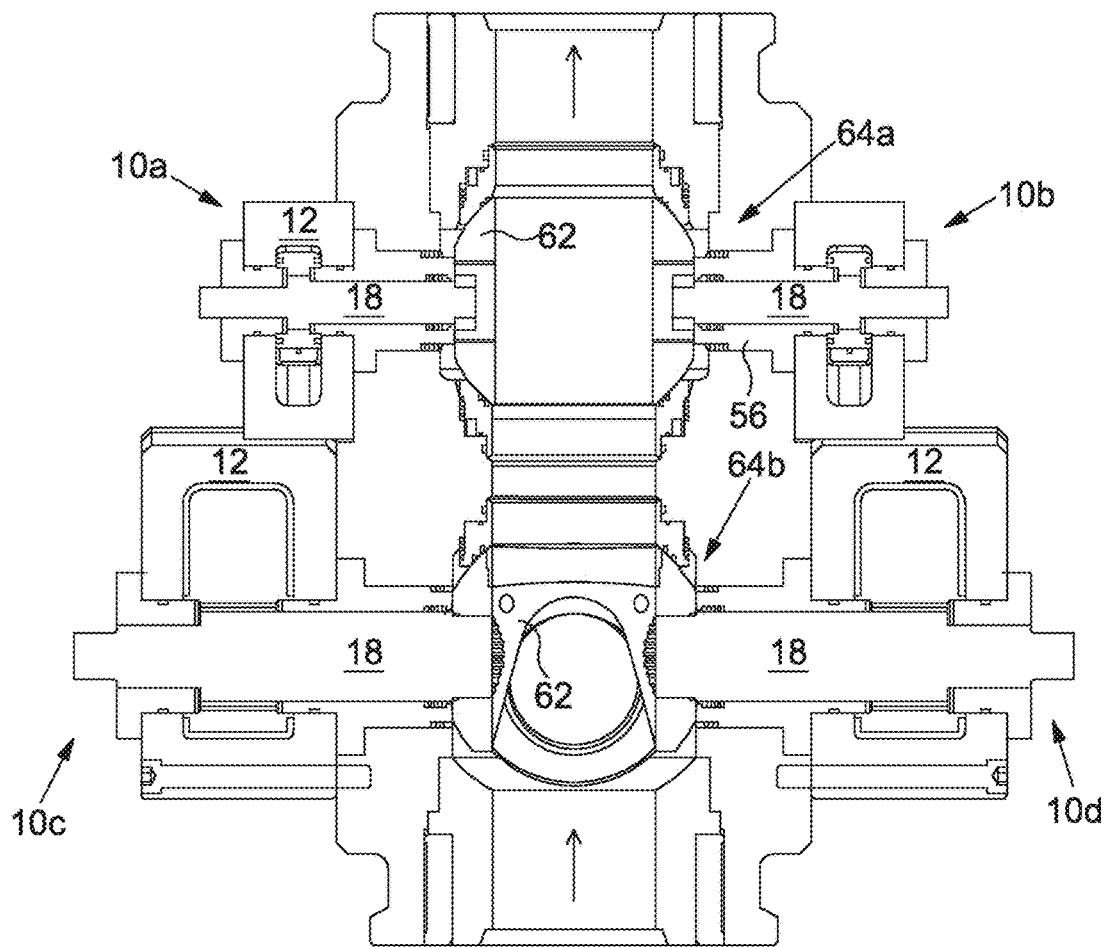
FIG. 13 is a cross-section of a valve block comprising four actuators according to the disclosure.

FIG. 13 illustrates a cross-sectional view through a valve block. The valve block comprises two ball valve apparatuses 64a, 64b. Each ball valve apparatus 64a, 64b is actuated by two actuators 10a, 10b, 10c, 10d, one connected to either side of the ball valve-member 62a, 62b and configured to simultaneously activate the respective ball valve-member 62a, 62b in the same direction. The upper ball valve apparatus 64a is for restricting flow through the flow path. The lower ball valve apparatus 64b is also for cutting through any item that may be located in the flow path at the time of activation. The forces required to provide this cutting functionality may be very high. As such, the actuators 10c, 10d which are connected to the lower ball valve apparatus 64b are much larger than those connected to the upper ball valve apparatus 64a. The larger actuators 10 comprise larger rotary pistons 14 and can therefore output a larger torque.

In FIG. 13, the actuators are separable from the valve block. The actuators are therefore separate components and are attached to the housing of the valve block—for example by means of bolts through the housing 12 and/or attachment bracket 56.

Figure 14:
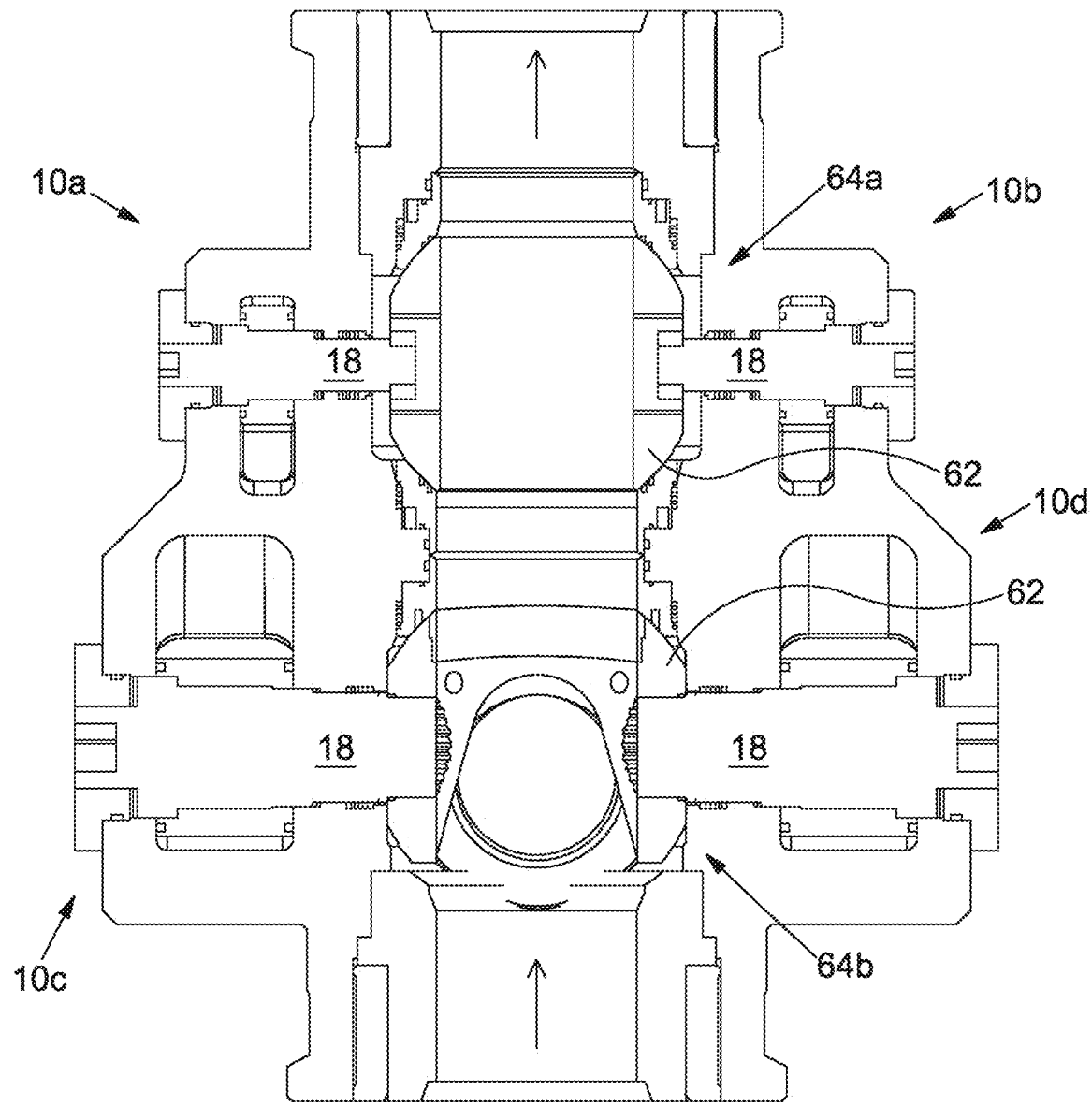
FIG. 14 is a cross-section of a further valve block comprising four actuators according to the disclosure.

FIG. 14 shows an alternative arrangement of a valve block, similar to that of FIG. 13. The valve block of FIG. 14 also comprises an upper and lower ball valve assembly 64a, 64b, each actuated by two actuators 10a, 10b, 10c, 10d. In the valve block of FIG. 14, the actuators 10 are integral with the valve block. As such, the housing of the actuators 10 is integral with the housing of the valve block.

The invention claimed is:

1. A rotary actuator comprising:
a unitary housing having a cavity therein and defining a continuous internal sealing surface; and
a rotary piston located within the cavity and in sealing engagement with the sealing surface of the cavity such that the rotary piston divides the cavity into isolated first and second chambers, the rotary piston arranged to rotate about a rotation axis in accordance with a pressure differential applied between the first and second chambers, the rotary piston including,
a vane, and
a sealing protrusion, the sealing protrusion extending from the rotation axis diametrically opposite to the vane, and the sealing protrusion being shorter in length than the vane, the vane and the sealing protrusion both dividing the cavity into the isolated first and second chambers.

2. The rotary actuator according to claim 1, wherein the rotary actuator is a fractional turn rotary actuator.

3. The rotary actuator according to claim 1, wherein the rotary actuator is configured to be coupled to a device requiring actuation.

4. The rotary actuator according to claim 1, wherein an opening is formed in the housing to provide access to the cavity.

5. The rotary actuator according to claim 4, wherein the opening extends into the cavity at a location which is remote from the sealing surface such that the opening does not disrupt the sealing surface.

6. The rotary actuator according to claim 4, further comprising:
a closure structure for closing the opening.

7. The rotary actuator according to claim 6, wherein the closure structure defines a surface of the cavity.

8. The rotary actuator according to claim 6, wherein the closure structure defines a surface of one of the first and second chambers.

9. The rotary actuator according to claim 6, wherein the closure structure comprises a fluid port for facilitating fluid communication with one of the first and second chambers.

10. The rotary actuator according to claim 1, wherein the rotary piston comprises a hub, defining the rotation axis, and a vane which extends from the hub.

11. The rotary actuator according to claim 1, further comprising;
a sealing structure between the rotary piston and the internal sealing surface.

12. The rotary actuator according to claim 11, wherein the rotary piston comprises a groove around a periphery therein, the groove configured to receive the sealing structure.

13. The rotary actuator according to claim 11, wherein the sealing structure extends around an edge of the vane of the rotary piston and around a circumference of a hub of the rotary piston.

14. The rotary actuator according to claim 1, wherein the sealing surface comprises a first arcuate face defining an outer surface of the first and second chambers, along which a first tip of the rotary piston moves when the rotary piston rotates.

15. The rotary actuator according to claim 14, wherein the sealing surface comprises two opposing faces which define opposing sides of the chambers.

16. The rotary actuator according to claim 15, wherein the sealing surface comprises a second arcuate face along which a second tip of the rotary piston moves when the rotary piston rotates, wherein the two opposing faces connect the first and second arcuate faces.

17. The rotary actuator according to claim 1, further comprising:
a drive structure rotatably coupled to the rotary piston and extending from the housing, the drive structure being configured for connection to a device requiring actuation.

18. The rotary actuator according to claim 17, wherein the drive structure extends through an attachment structure which facilitates attachment to a device requiring actuation.

19. A valve apparatus, comprising:
a valve housing defining a flow path;
a valve member mounted in the housing; and
a rotary actuator according to claim 1 operatively coupled to the valve member.

* * * * *